United States Patent
Rakshit

(10) Patent No.: US 11,062,313 B2
(45) Date of Patent: Jul. 13, 2021

(54) SMART CONTRACT ENABLED SMART CONTACT-BASED COMPUTING

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 16/569,793

(22) Filed: Sep. 13, 2019

(65) Prior Publication Data

US 2021/0081953 A1    Mar. 18, 2021

(51) Int. Cl.
| G06Q 20/40 | (2012.01) |
| G06F 3/01 | (2006.01) |
| G06Q 20/20 | (2012.01) |
| G06F 21/32 | (2013.01) |

(52) U.S. Cl.
CPC ....... *G06Q 20/40145* (2013.01); *G06F 3/013* (2013.01); *G06F 21/32* (2013.01); *G06Q 20/20* (2013.01)

(58) Field of Classification Search
CPC .. G06Q 20/40145; G06Q 20/20; G06F 3/013; G06F 21/32
See application file for complete search history.

(56) References Cited

U.S. PATENT DOCUMENTS

| 9,367,677 B1 | 6/2016 | Adhami |
| 2015/0015459 A1 | 1/2015 | Cho |
| 2016/0337827 A1 * | 11/2016 | Bjontegard ............. H04L 67/18 |
| 2017/0173262 A1 * | 6/2017 | Veltz .................... A61B 5/0022 |
| 2017/0270636 A1 * | 9/2017 | Shtukater ............... H04N 5/332 |
| 2018/0247038 A1 | 8/2018 | Lindemann |
| 2019/0089769 A1 | 3/2019 | Rakshit |
| 2020/0076786 A1 * | 3/2020 | Spivack ............. G06Q 20/3276 |

OTHER PUBLICATIONS

"Peripheral vision", Wikipedia, this page was last edited on Jul. 17, 2019, 5 pages., <https://en.wikipedia.org/wiki/Peripheral_vision>.

(Continued)

*Primary Examiner* — Florian M Zeender
*Assistant Examiner* — Joseph M Mutschler
(74) *Attorney, Agent, or Firm* — Joseph P. Curcuru; Stephen R. Yoder

(57) ABSTRACT

Embodiments describe an approach for authorizing and documenting eye contact-based computing events using smart contracts. Embodiments comprise receiving smart contract rules from a user associated with performing the eye contact-based computing events using a smart lens, monitoring eye movement for a triggering event, determining an eye contact-based computing request is occurring based on an occurrence of a triggering event, and authenticating a user through biometric security measures on the smart lens. Furthermore, embodiments comprise identifying a focus angle based on measurements by the smart lens, determining that the smart contract rules are satisfied by the focus angle and the authenticating the user, executing the eye contact-based computing event; and logging the eye contact-based computing event on a ledger system.

20 Claims, 6 Drawing Sheets

(56) References Cited

OTHER PUBLICATIONS

Elgan, Mike, "Why a smart contact lens is the ultimate wearable", Contributing Columnist, Computerworld, May 9, 2016, 5 pages, <https://www.computerworld.com/article/3066870/why-a-smart-contact-lens-is-the-ultimate-wearable.html>.
Jacobs, Suzanne, "What Else Could Smart Contact Lenses Do?", MIT Technology Review, Jul. 22, 2014, 8 pages, <https://www.technologyreview.com/s/529196/what-else-could-smar t-contact-lenses-do/>.
McKay et al., "Look 'Em in the Eye: Part 1—The Importance of Eye Contact", Feb. 24, 2019, 2 pages, <https://www.artofmanliness.com/articles/eye-contact/>.
Shu et al., "Exploring Security in Software Architecture and Design Chapter8 Blockchain for Security of Cloud-Based Online Auction", Copyright © 2019, IGI Global, pp. 189-195, <https://books.google.co.in/books?id=b_iEDwAAQBAJ&pg=PA192&lpg=PA192&dq=%22eye+contact%22+%22smart+contract%>2&source=bl&ots=uicxeMfuZV&sig=ACfU3U3fiqwazpgiAe80EBNE5Ry2UcJ55g&hl=en&sa=X&ved=2ahUKEwjKs8S /VieviAhXFal-8KHUXEACUQ6AEwGHoECAkQAQ#v=oneDaae&q=%22eve%20contact%22%20%22smart%20contract.
Rakshit, Sarbajit, "Eye Contact Based Financial Transaction", Filed Herewith, 33 pages.

\* cited by examiner

SMART CONTRACT ENABLED SMART CONTACT-BASED COMPUTING

BACKGROUND OF THE INVENTION

The present invention relates generally to the field of eye contact-based computing, and more particularly to eye contact-based computing using smart contracts.

A smart contract is a computer protocol intended to digitally facilitate, verify, or enforce the negotiation or performance of a contract. Smart contracts allow the performance of credible transactions without third parties. Smart contract transactions are trackable and irreversible. Proponents of smart contracts claim that several kinds of contractual clauses may be made partially or fully self-executing, self-enforcing, or both. The aim of smart contracts is to provide security that is superior to traditional contract law and to reduce other transaction costs associated with contracting. Various cryptocurrencies have implemented types of smart contracts. With the present implementations, based on blockchains, smart contracts are used more specifically in the sense of general purpose computing that takes place on a blockchain or distributed ledger.

SUMMARY

Embodiments of the present invention disclose a method, a computer program product, and a system for authorizing and documenting eye contact-based computing events using smart contracts, the method comprising: receiving smart contract rules from a user associated with performing the eye contact-based computing events using a smart lens; monitoring eye movement for a triggering event; determining an eye contact-based computing request is occurring based on an occurrence of a triggering event; authenticating a user through biometric security measures on the smart lens; identifying a focus angle based on measurements by the smart lens; determining that the smart contract rules are satisfied by the focus angle and the authenticating the user; executing the eye contact-based computing event; and logging the eye contact-based computing event on a ledger system.

DETAILED DESCRIPTION

Figure 1:
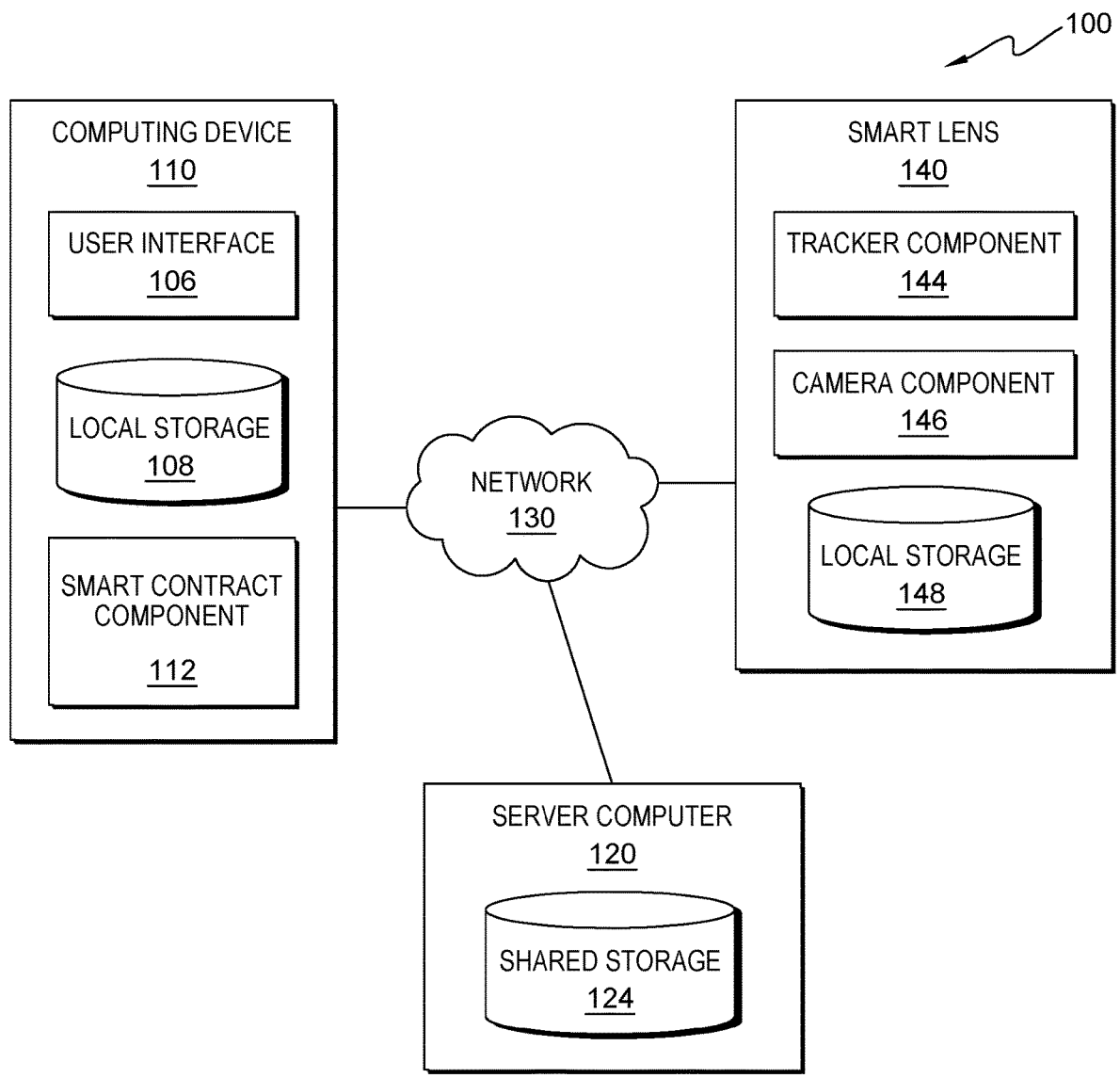
FIG. 1 is a functional block diagram illustrating a distributed data processing environment, in accordance with an embodiment of the present invention.

In some embodiments of the present invention, when a smart eye-contact lens (i.e., smart lens) event is detected then a computing process can be initiated. Examples of a smart lens include a wearable smart contact lens, a pair of smart glasses, and/or any form of smart eyewear or headwear known in the art that contains a lens. Eye contact-based computing can bring various advantages over mobile device-based computing. For example, eye contact-based computing does not require the user to hold a device or does not require the user to provide a voice command. The user can silently perform the eye contact-based computing, and at the same time, embodiments of the present embodiment can perform retina-based authentication. Users include a sending party and a receiving party. The sending party sends data to the receiving party and the receiving party receives data from the sending party.

As eye contact-based computing systems gain popularity, there is a need to ensure trust in eye contact-based computing. For example, trust may be imparted to an eye-contact computing event by requiring a particular smart lens, a threshold duration of eye contact, requiring the eye gaze point through the smart lens is within specified angle of a contracting user or point of sale device. Currently, in the art, smart lenses are used for both social interactions and for computing (e.g., eye contact-based computing) creating ambiguity in the purpose of smart lens. Embodiments of the present invention can solve the trust concerns stated above by tracking and logging the eye contact-based computing on blockchain ledgers (ledger system), via smart contracts, and executing the eye contact-based computing within the parameters of a smart contract.

Embodiments of the present invention can enable eye contact-based computing that can be controlled by smart contracts, wherein steps of the eye contact-based computing can be logged on a ledger system. Embodiments of the present invention improves the art of eye contact-based computing by ensuring trust in the eye contact-based computing and eliminating ambiguity in the eye contact-based computing. The term eye contact as used herein refers to the point of interest or gaze point of an eye. Several terms may be used interchangeably to refer to the point of eye contact including: focus point, eye focus, eye direction, focus direction, and gaze point. The term focus angle, or field of view, is used to describe an equal angle to each side (horizontally or vertically) of the point of eye contact. In some embodiments of the present invention, a threshold focus angle is specified to trigger a computing event. That is, when a contracting user is within a specified focus angle of the user, a computing event may be initiated or executed.

It should be noted herein that in the described embodiments, participating parties have consented to having their images uploaded and saved, being recorded and monitored, and participating parties are aware of the potential that such recording and monitoring may be taking place. In various embodiments, for example, when downloading or operating an embodiment of the present invention, the embodiment of the invention presents a terms and conditions prompt enabling the interested parties to opt-in or opt-out of participation.

Implementation of embodiments of the invention may take a variety of forms, and exemplary implementation details are discussed subsequently with reference to the figures (i.e., FIG. 1-FIG. 5).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, smart lens 140, and server computer 120 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, network 130 can be any combination of connections and protocols that will support communications between computing device 110, smart lens 140, and server computer 120, and any other computing devices and/or storage devices (not shown in FIG. 1) within distributed data processing environment 100.

In some embodiments of the present invention, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130 and/or capable of executing machine-readable program instructions and communicating with server computer 120.

In some embodiments of the present invention, computing device 110 can represent any programmable electronic computing device or combination of programmable electronic computing devices capable of executing machine readable program instructions, manipulating executable machine-readable instructions, and communicating with server computer 120, smart lens 140 and other computing devices (not shown) within distributed data processing environment 100 via a network, such as network 130. Computing device 110 can include an instance of user interface (interface) 106, local storage 108, smart lens 140 and/or smart contract (contract) 112. In various embodiments, not depicted in FIG. 1, computing device 110 can comprise one or more cameras. In various embodiments, the one or more cameras can be low light cameras. In other embodiments, the one or more cameras can be any type of camera known in the art. In various embodiments, not depicted in FIG. 1, computing device 110 can have a plurality of user interfaces. In other embodiments, not depicted in FIG. 1, distributed data processing environment 100 can comprise a plurality of computing devices, plurality of server computers, and/or one a plurality of networks. Computing device 110 can include internal and external hardware components, as depicted, and described in further detail with respect to FIG. 5.

User interface (interface) 106 provides an interface to contract 112 on computing device 110. Computing device 110, via user interface 106, can enable a user and/or a client to interact with contract 112 and/or server computer 120 in various ways, such as sending program instructions, receiving program instructions, sending and/or receiving messages, updating data, sending data, inputting data, editing data, collecting data, and/or receiving data. In one embodiment, interface 106 can be a graphical user interface (GUI) or a web user interface (WUI) and can display at least text, documents, web browser windows, user options, application interfaces, and instructions for operation. interface 106 can include information (such as graphic, text, and sound) presented to a user and control sequences the user employs to control operations. In another embodiment, interface 106 can be a mobile application software providing an interface between a user of computing device 110, smart lens 140, and server computer 120. Mobile application software, or an "app," can be designed to run on smart phones, tablet computers and other computing devices. In an embodiment, interface 106 can enable the user of computing device 110 to at least send data, input data, edit data (annotations), collect data and/or receive data.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 5.

Each of shared storage 124, local storage 148, and local storage 108 can be a data/knowledge repository and/or a database that can be written and/or read by one or a combination of contract 112, server computer 120 and computing device 110. In the depicted embodiment, shared storage 124, local storage 148, resides on server computer 120 and local storage 108 resides on computing device 110. In another embodiment, shared storage 124, local storage 148, and/or local storage 108 can reside elsewhere within distributed data processing environment 100, provided that each can access and is accessible by computing device 110 and server computer 120. Shared storage 124, local storage 148, and/or local storage 108 can each be implemented with any type of storage device capable of storing data and configuration files that can be accessed and utilized by server computer 120, such as, but not limited to, a database server, a hard disk drive, or a flash memory.

In some embodiments of the present invention, shared storage 124, local storage 148, and/or local storage 108 can each be a hard drive, a memory card, a computer output to laser disc (cold storage), and/or any form of data storage known in the art. In some embodiments, shared storage 124, local storage 148, and/or local storage 108 can each be one or more cloud storage systems and/or databases linked to a cloud network. In various embodiments, shared storage 124, local storage 148, and/or local storage 108 can access, store, and/or house eye contact-based computing event information, and/or data shared throughout distributed data processing environment 100 (e.g., smart contract information stored on a ledger system.

Smart lens 140 can be any form of wearable smart contact lens, smart glasses, or any form of smart eyewear or headwear known in the art that contains a lens. In the depicted embodiment, Smart lens 140 includes tracker component (tracker) 144, camera component (camera) 146, and local storage 148. Alternatively, a smart lens comprises augmented reality capabilities, via an augmented reality component, as it is known in the art. Smart lens 140 can be paired and communicate with computing device 110, in which computing device 110 can communicate with a transaction system for executing a transaction.

Tracker 144 can be a gaze point tracker that can identify the eye focus of the user along with peripheral vision, or focus angle, of the user. In various embodiments, smart lens 140 can comprise an internal compass to identify the direction of focus of the user. Camera 146 can be one or more cameras that are known in the art. In various embodiments, camera 146 can provide live or recorded video feeds (video feed) of what the user is viewing to computing device 110 or more specifically contract 112.

In some embodiments of the present invention, contract 112 is executed on computing device 110. In the depicted embodiment, contract 112 is in electronic communication with computing device 110, server computer 120 and/or smart lens 140 via network 130. Alternatively, contract 112 is executed on server computer 120. Alternatively, contract 112 is located and/or executed anywhere within distributed data processing environment 100. Alternatively, contract 112 is linked to a ledger system (e.g., blockchain) executing on a server, such as server computer 120. In some embodiments of the present invention, contract 112 can store ledger and transaction information on a ledger system. In some embodiments of the present invention, contract 112 can identify the level of attention of a user by analyzing the focus angle of the user around the area of eye contact-based computing.

In some embodiments of the present invention, contract 112 can receive a video feed from smart lens 140, via camera component 146, from both the sending party and the receiving party of the eye contact-based computing event. Eye contact-based computing or an eye contact-based computing event is any type of financial or data (e.g., files, folders, images, etc.) transaction known in the art. In various embodiments, the feed from smart lens 140 can comprise of, but is not limited to: retina scanning feed of sending and receiving party, duration of eye contact between two users (i.e., receiving party and sending party), and overlapping focus angle between sending and receiving party. When the focus angle overlaps with another user's focus angle or a point of sale (POS) sensor it enables contract 112 to perform eye contact-based computing events. In various embodiments, validation of the eye contact-based computing occurs when the conditions are met for smart lens-based computing. The conditions for two-user eye contact-based computing may include: engaging in eye contact with a user for more than a predetermined amount of time within a predetermined focus angle and ensuring that both users have overlapping focus angles.

In some embodiments of the present invention, contract 112 can differentiate between the social smart lens-based interaction and eye contact-based computing, and accordingly contract 112 can control the eye contact-based computing. A social smart lens-based interaction is simply a casual social interaction with another user. In various embodiments, contract 112 can distinguish between a social interaction eye-contact event and an eye contact-based computing event by monitoring elements of a computing event including, for example: two contracting users, the point of eye contact, and observing smart contract-based focus angles.

In various embodiments, contract 112 can enable a user to establish smart contract rules, in which the user can set smart contract rules to adjust the eye focus angle on smart lens 140 for different types of contextual situation, participating user, type of eye contact-based computing events, etc. For example, a user can establish custom contract rules for individual users, crowds, financial transactions, type of transactions, data transfers, multiple user transaction (e.g., more than two people), remote transactions, type POS system or POS sensor, and/or any other type of transaction or eye contact-based computing event known in the art. In various embodiments, a user can set the width or focus angle of the gaze point for each contract rule In that way, contract 112 can dynamically adjust the focus angle for each potential contract rule being applied during a computing event. In various embodiments, contract 112 will only initiate an eye contact-based computing event if the contractually specified focus angle of each contracting user overlaps.

Figure 2A:
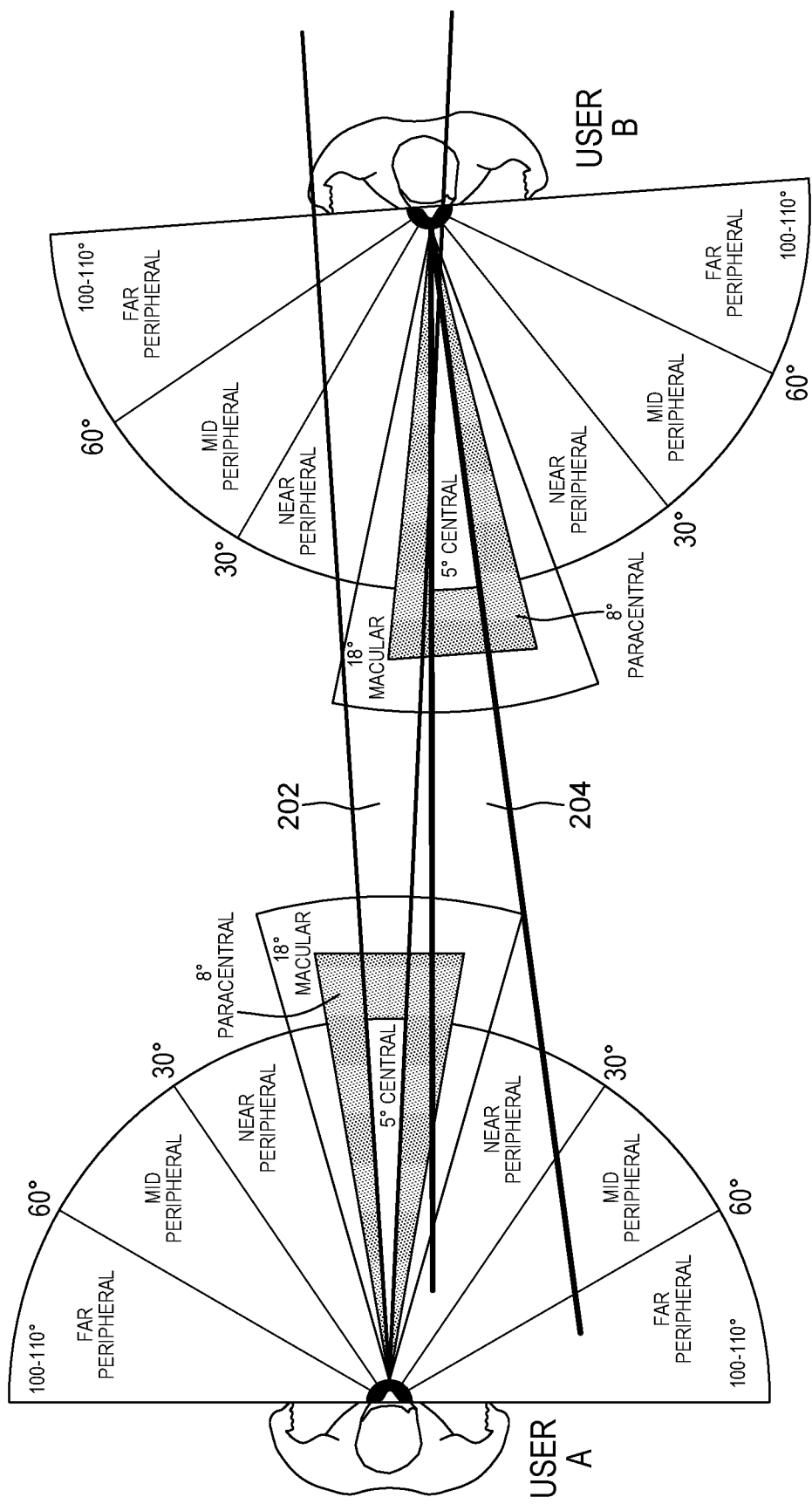
FIG. 2A illustrates an example of two users trying to conduct an eye contact-based computing event using smart contract rules within the distributed data procession environment of FIG. 1, in accordance with one example of the present invention.
Figure 2B:
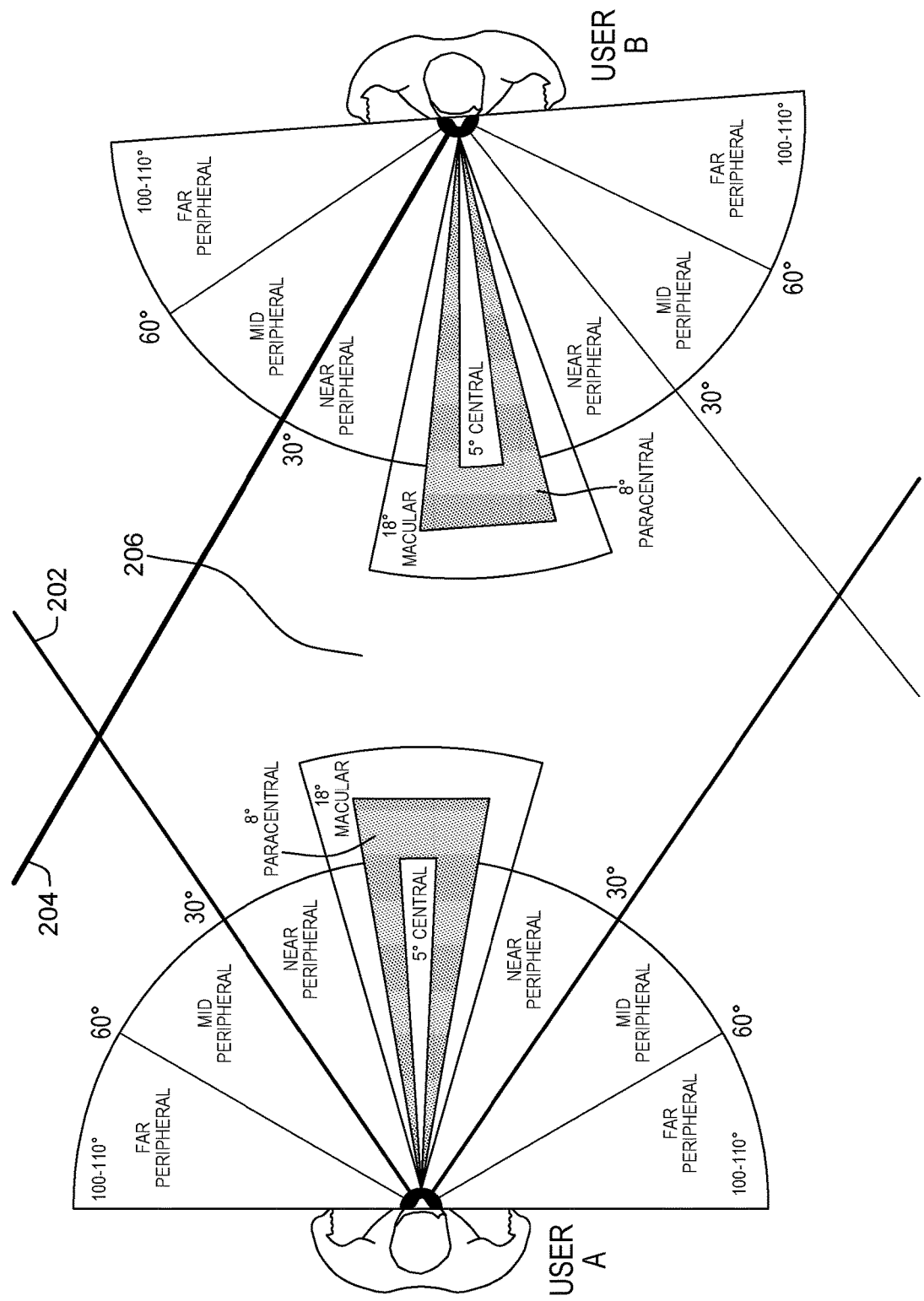
FIG. 2B illustrates an example of changing smart contract rules for the eye contact-based computing event, within the distributed data procession environment of FIG. 1, in accordance with one example of the present invention.

For example, as shown in FIG. 2A, user A's focus angle 202 and user B's focus angle 204 are both narrow according to a specified smart contract rule and do not overlap. In this example, per smart contract rule, user A and user B do not have the proper eye contact to engage/initiate an eye contact-based computing event because the contract rule states that the specified focus angles of user A and user B must overlap. Therefore, in this example, eye contact-based computing will not be executed. In various embodiments, contract 112 can have a smart contract rule that changes the focus angle according to smart contract rules so there will be an increased likelihood of focus angle overlap between two users and an eye contact-based computing event can be initiated. In various embodiments, contract 112 can comprise a rule to change the focus angle dynamically for different types of contextual situations, participating users, and/or types of eye contact-based computing.

In some embodiments, once the focus angle is changed dynamically according to contract 112, then the eye contact-based computing can be executed. For example, in FIG. 2B, user A and user B consistently perform eye contact-based computing with each other and have established contract rules for each other. In this example, user A and user B have established a contract rule, via contract 112, that instructs smart lens 140 for each user to widen the focus angles when the two users are looking at each other. In this example, user A's focus angle 202 and user B's focus angle 204 overlap (e.g., overlapping space 206). In this example, contract 112 identifies that user A's focus angle 202 and user B's focus angle 204 create overlapping space 206 and begins to initiate an eye contact-based computing event.

In some embodiments of the present invention, contract 112 can create a smart contract based on types of transaction needs to be performed (e.g., financial transaction (amount of transaction), and document transaction (types of documents, like confidential, contextual sense, size of document etc.)); sending and receiving party recognition (retina recognition); focus angle of the sending and receiving party; and distance between the sending and receiving party. In various embodiments, smart contract rule can be created with the above parameters for different types of transaction. For different types of transaction different types of transaction smart contract rule can be created and enforced.

In various embodiments, where augmented reality capabilities are available, contract 112 can display an augmented reality prompt to the user via smart lens 140. In various embodiments, contract 112 can display the focus angle of each user in the eye contact-based computing event. For example, referencing FIG. 2, contract 112 displays the focus angle of user B to user A and the focus angle of user A to user b. In some embodiments, contract 112 can display both the sending party and receiving party's focus angle on both the sending party's smart lens 140 and the receiving party's smart lens 140. In various embodiments, while eye contact-based computing is in progress, the augmented reality component of smart lens 140 can display the focus angle required to execute the eye contact-based computing in order to aid the user (e.g., assist the user in looking in the proper direction).

Some embodiments of the present invention follow a reconnection protocol. That is, if any eye contact-based computing comprises a prolonged transaction period (e.g., sending large files), then contract 112 retains the transaction session or reestablishes the transaction session if the connection is briefly lost or interrupted. For example, if eye contact breaks or a user is removed from the focus angle during the transaction then contract 112 can initiate the transaction from the point of failure. Smart contract rules govern the permitted time lapse while maintaining a session or being permitted to reestablish a session. Some embodiments of the present invention permit session continuance for large file transfer at a threshold of 5 MB of data. Further, some embodiments of the present invention permit session continuance for loss of eye contact of 3 seconds.

In various embodiments, augmented reality can be utilized during eye contact-based computing. For example, smart lens 140 displays the user's field of view, eye direction, and the area where the user needs to focus on in order to complete the eye contact-based computing transaction. In another example, contract 112 can enable smart lens 140 to display visual prompts to the user to verify the linked credit card or verify that the correct files are being sent. In various embodiments, when a user wears smart lens 140, contract 112 can instruct smart lens 140 to perform retina scanning to authenticate the user. In various embodiments a gaze point tracker can identify the eye focus of the user along with peripheral vision of the user. In various embodiments, smart lens 140 can comprise an internal compass to identify the direction of focus of the user.

In various embodiments, contract 112 can request that the user confirm the eye contact-based computing event by prompting then user, via augmented reality to select the appropriate financial transaction card by showing a selection of stored credit and debit cards that the user can use for the transaction. In various embodiments, the stored payment/transaction method (e.g., credit card, debit card, linked checking or saving account, files, documents, etc.) can be visually displayed to the user on smart lens 140 and can display the amount of the transaction, and the amount available on the stored credit and debit cards. In various embodiments, contract 112 can enable a user (sending party) to adjust and confirm the transaction amount or select and confirm the correct file or data to share.

In various embodiments, during eye contact-based computing event, contract 112 can enable and collect the recognition/authorization of the user based on retina scanning of the user with smart lens 140, the eye direction of the user, and focus angle of the user in the peripheral vision. In various embodiments, when a user wants to perform an eye contact-based transaction, various parameters can be considered including: a two-party eye contact event, duration of eye contact, overlapping focus angles of two users, and/or recognition of sending and receiving party. In various embodiments, smart contract rules can be created for eye contact-based computing.

In various embodiments, the transaction system can be controlled by contract 112 and the transaction parameters can be controlled by contract 112 to execute the eye contact-based computing event. In various embodiments, smart lens 140 can visually display the activity to the performed in the augmented reality menu, and user can select required activity to be performed. In various embodiments, based on the user selected eye contact-based computing event, the smart contract rule can validate the type of transaction and/or validate the sending and receiving parties. In various embodiments, the contract 112 can validate the smart contract rule to execute the eye contact-based computing based on the received feed from smart lens 140.

In various embodiments, if users, devices and type of transactions are identified but the feed from the smart contact lens are not validated (e.g., like offset focus direction, inappropriate distance etc.) then smart contact cannot execute the transaction. In various embodiments, the augmented reality component of smart lens 140 can provide appropriate guidance to the sending and receiving party to ensure proper eye contact is meet and to ensure the smart contract rules are satisfied so contract 112 can validate and execute the transaction. In various embodiments, contract 112 can enforce attention of the users while performing eye contact-based transaction through visual ques and prompts via the augmented reality component. In various embodiments, smart lens 140 can ensure one or more transactions are being done with the authorized person. Thus, in various embodiments, smart lens 140 can determine the difference between the eye contact-based social interaction and eye contact-based computing event.

Figure 3:
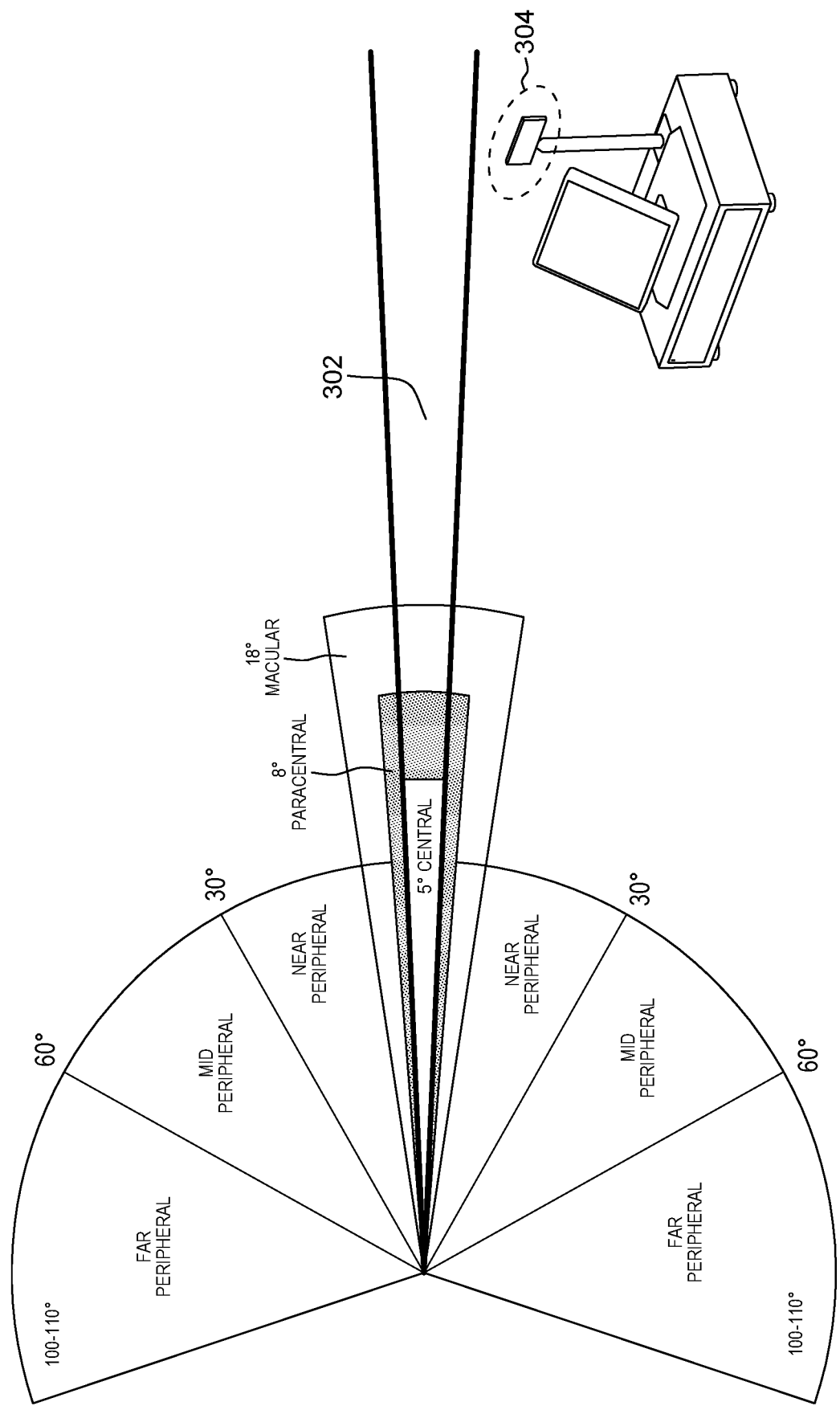
FIG. 3 illustrates an example of offset eye contact within the distributed data procession environment of FIG. 1, in accordance with one example of the present invention.

In various embodiments, contract 112 can conduct eye contact-based computing events with a POS system in conjunction with a positioning system, such as global positioning system (GPS). In various embodiments, contract 112 can initiate an eye contact-based computing event when a positioning system indicates that a user is within a predetermine distance from the POS system sensor and the user's field of view (i.e., eye focus angle) overlaps with the POS system. Alternatively, the POS sensor has a limited electronic communication range and when a user is within the communication range of the sensor, eye contact-based computing communicates with the POS system to permit operation of the POS system using gaze point programming. In various embodiments, contract 112 detects an eye contact-based computing event when a POS system sensor is in a user's field or view and the user makes eye contact with the POS system sensor for a predetermined amount of time. For example, as shown in FIG. 3, contract 112 is given a smart contract rule for offset eye contact meaning the focus angle must overlap with the POS system sensor in order to initiate an eye contact-based computing event. In this example, for a financial transaction, the focus angle 302 is defined as 5 degrees in the user's peripheral vision by a pre-established contract rule. In this particular example, the transaction will not be executed because the focus angle 302 is not lined up (i.e., overlapping) with the location of the point of sale system sensor 304.

Figure 4:
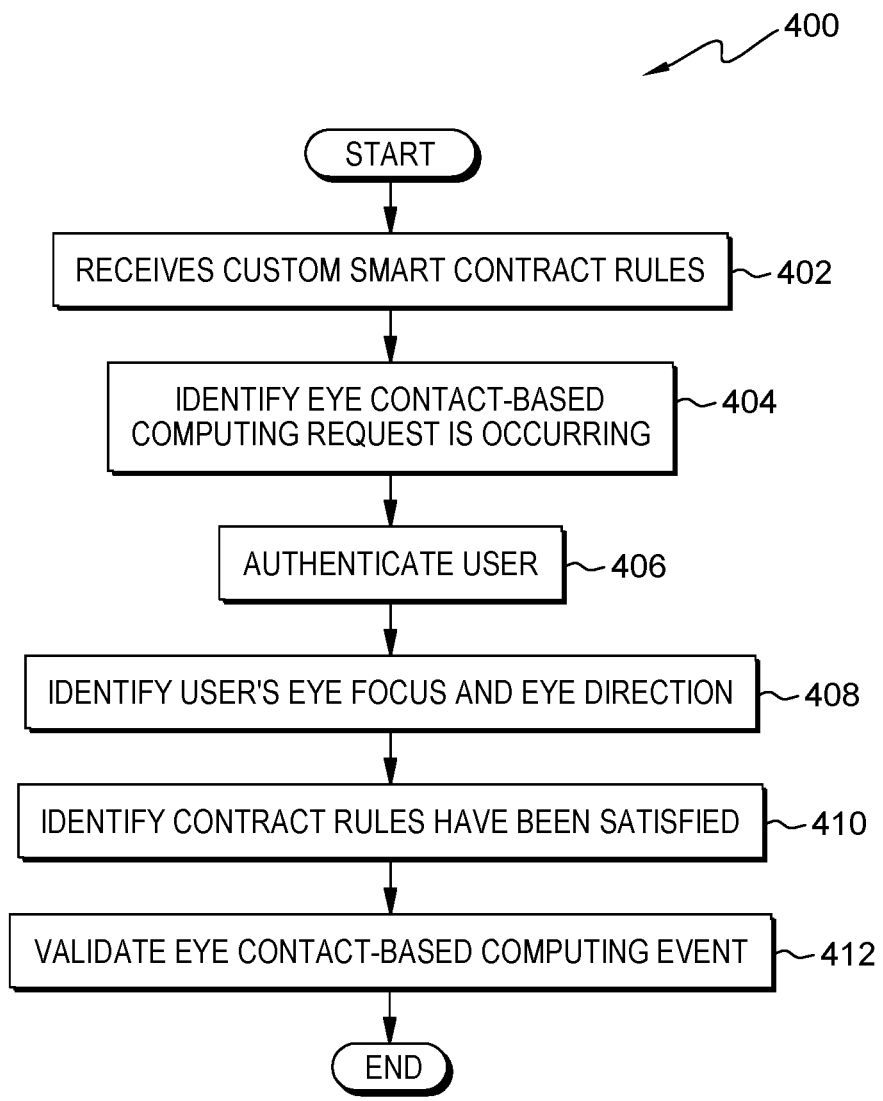
FIG. 4 illustrates operational steps of smart contract component, in communication with a computing device, within the distributed data processing environment of FIG. 1, for the eye contact-based computing event using smart contracts, in accordance with an embodiment of the present invention.

FIG. 4 illustrates operational steps of contract 112, generally designated 400, in communication with computing device 110, within distributed data processing environment 100 of FIG. 1, for eye contact-based computing event using smart contracts, in accordance with an embodiment of the present invention. FIG. 4 provides an illustration of one implementation and does not imply any limitations with regard to the environments in which different embodiments can be implemented. Many modifications to the depicted environment can be made by those skilled in the art without departing from the scope of the invention as recited by the claims.

In step 402, contract 112 receives custom smart contract rules. In various embodiments, contract 112 can receive and enforce smart contract rules created by the user. In some embodiments, contract 112 can dynamical adjust and create smart contract rules based on environmental and social factors. In some embodiments, contract 112 can prompt a user to create smart contract rules for different types of transaction, situations, social context, and/or for specific users. In some embodiments, contract 112 can create smart contract rules based on learned transaction habits and social interactions from the user.

In step 404, contract 112 identifies that an eye contact-based computing event is occurring. In various embodiments, contract 112 can identify an eye contact-based computing event is occurring when a user makes eye contact with another user or POS sensor for more than a pre-determined amount of time. In some embodiments, contract 112 can detect an eye contact-based computing event when a first user (e.g., sending party) receives a transaction request form a second user (e.g., receiving party).

In step 406, contract 112 authenticates the user. In various embodiments, contract 112 can authenticate both the sending user and the receiving user using retina scanning, facial recognition software, and/or any other form of biometric security measure known in the art. For example, a first user receives a transaction request from a second user. In this example, contract 112 instructs smart lens 140 associated with the first user to authenticate the first user by performing a retinal scan and authenticate the second user using facial recognition. In this example, before the first user sent the transaction request to the first user, contract 112 instructs smart lens 140 associated with the second user to authenticate the second user by performing a retinal scan and authenticate the first user using facial recognition.

In step 408, contract 112 identifies eye focus, focus angle, and/or eye direction. In some embodiments of the present invention, the direction in which a contracting eye is looking determines the actions taken during the computing event. Alternatively, the focus of the contracting eye determines the actions taken during the computing event. In various embodiments, contract 112 can identify both the eye focus and eye direction of both the sending user and receiving user using tracker 144 while processing the identified computing event. In various embodiments, contract 112 can enable smart lens to display a user's eye direction, eye focus, and focus angle to another user, in which each user can see the other user's eye direction, eye focus, and focus angle in addition to their own eye direction, eye focus, and focus angle on smart lens 140 associated with each user.

In step 410, contract 112 determines the smart contract rules have been satisfied. In various embodiments, contract 112 can determine that the smart contract rules established by the user to execute eye contact-based computing events have been satisfied by the user. The process of determining may include identifying the applicable smart contract rules and reviewing elements of rules to confirm compliance with the rules. In various embodiments, contract 112 can verify that two or more users' eye-directions and focus angles overlap or if a user's eye-direction and focus angle overlap with the location of a POS sensor in accordance with the establish smart contract rules. In various embodiments, contract 112 can dynamically adjust a threshold user eye-direction and focus angle based on the established smart contract rules.

In various embodiments, not depicted in FIG. 4, if contract 112 determines that the smart contract rules have not been satisfied then contract 112 can terminate the eye contact-based computing event. In some embodiments of the present invention, contract 112 can display an augmented reality prompt to the user indicating that the smart contract rules have not been satisfied and asks the user if the user would like to continue trying the eye contact-based computing event or if the user would like to cancel the eye contact-based computing event. In some embodiments of the present invention, contract 112 can display an augmented reality prompt detailing that the eye contact-based computing event has failed or has been canceled because the smart contract rules have not been satisfied. In some embodiments of the present invention, contract 112 can display prompts on smart lens 140 and/or computing device 110, wherein the displayed prompts are interactive or notification and displayed in augmented reality and/or reality on UI 106.

In step 412, contract 112 validates the smart lens-based computing request based on the smart contract rules and eye contact-based computing smart contract rules. In various embodiments, contract 112 can display a responsive augmented reality prompt to the sending party, via smart lens 140, in which the responsive prompt queries the user to select a stored payment method and confirm the amount being sent or requested. In other embodiments, the sending party is required to select or confirm the file or data that is requested or being sent to the receiving party. In some embodiments, contract 112 can associate a payment method with a particular type of transaction based on an established contract rule and automatically suggest a payment method. In various embodiments, contract 112 creates a smart contract for each transaction completed through eye contact-based computing and logs each transaction on a ledger system.

Figure 5:
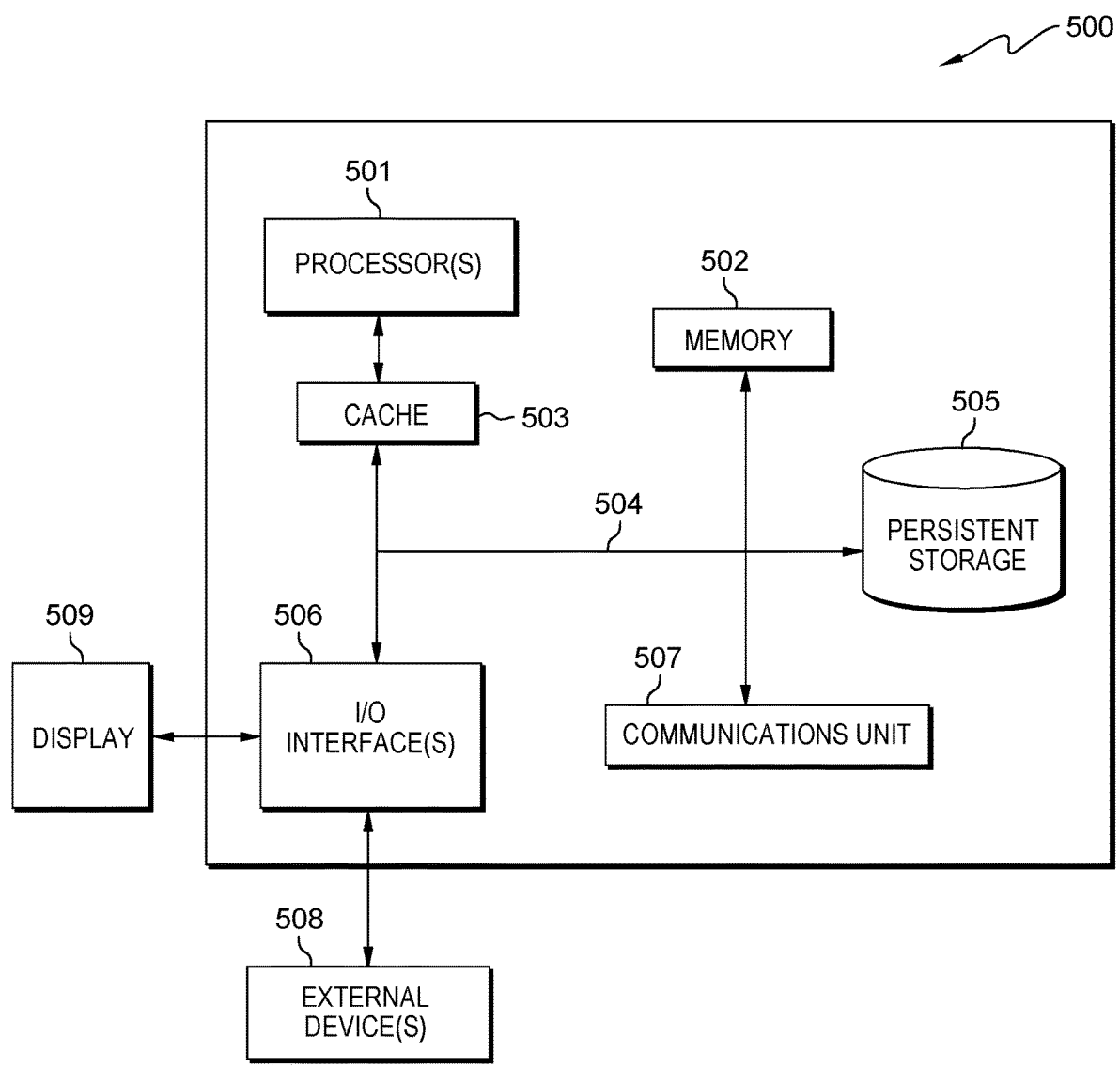
FIG. 5 depicts a block diagram of components of a computing device executing the smart contract component within the distributed data processing environment of FIG. 1, in accordance with an embodiment of the present invention.

FIG. 5 depicts computer system 500, where computing device 110 represents an example of computer system 500 that includes contract 112. The computer system includes processors 501, cache 503, memory 502, persistent storage 505, communications unit 507, input/output (I/O) interface(s) 506, display 509, external device(s) 508 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention can be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 505 can also be removable. For example, a removable hard drive can be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 can provide communications through the use of either or both physical and wireless communications links. Program instructions and data used to practice embodiments of the present invention can be downloaded to persistent storage 505 through communications unit 507.

I/O interface(s) 506 enables for input and output of data with other devices that can be connected to each computer system. For example, I/O interface 506 can provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for authorizing and documenting eye contact-based computing events using smart contracts, the method comprising:
   receiving smart contract rules from a user associated with performing the eye contact-based computing events using a smart lens;
   monitoring eye movement for a triggering event;
   determining an eye contact-based computing request is occurring based on an occurrence of the triggering event;
   authenticating the user through biometric security measures on the smart lens;
   identifying a focus angle based on measurements by the smart lens;
   determining that the smart contract rules are satisfied by the focus angle and the authenticating the user;
   executing the eye contact-based computing event; and
   logging the eye contact-based computing event on a ledger system.

2. The computer-implemented method of claim 1, wherein the triggering event is when the eye movement is a gaze point on the user for a predetermined amount of time and wherein identifying that the smart contract rules have been satisfied comprises:
   determining if the user's eye focus angle overlaps with another user's eye focus angle or overlaps with a point of sale sensor.

3. The computer-implemented method of claim 1 further comprising:
   prompting the user to create the smart contract rules, wherein prompting the user to create smart contract rules comprises:
      generating responsive prompts instructing the user to create custom smart contract rules for individual users, crowds, financial transactions, type of transactions, data transfers, multiple user transaction, remote transactions, or type of point of sale system.

4. The computer-implemented method of claim 3 further comprising:
   dynamically changing the users eye focus angle based on the smart contract rules, wherein dynamically changing comprises:
      adjusting the users eye focus angle to match a predetermined focus angle established for a particular smart contract rule associated with a particular eye contact-based computing event.

5. The computer-implemented method of claim 1, wherein identifying the user's eye focus angle comprising:
   generating an augmented reality display of the user's eye focus angle on the smart lens to assist the user in creating an overlapping eye focus angle with another user or a point of sale system.

6. The computer-implemented method of claim 1 further comprising:
   validating the eye contact-based computing event, wherein validating comprises:
      generating an augmented reality prompt on the smart lens that prompt the user to select a stored payment method and confirm an amount or file associated with the eye contact-based computing event.

7. The computer-implemented method of claim 1, wherein the triggering event is when the eye movement is a focus angle including a point of sale sensor.

8. The computer program product of claim 1, wherein the triggering event is when the eye movement is a focus angle including a point of sale sensor.

9. A computer program product for authorizing and documenting eye contact-based computing events using smart contracts, the computer program product comprising:
one or more computer readable storage devices and program instructions stored on the one or more computer readable storage devices, the stored program instructions comprising:
program instructions to receive smart contract rules from a user associated with performing the eye contact-based computing events using a smart lens;
program instructions to monitor eye movement for a triggering event;
program instructions to determine an eye contact-based computing request is occurring based on an occurrence of the triggering event;
program instructions to authenticate the user through biometric security measures on the smart lens;
program instructions to identify a focus angle based on measurements by the smart lens;
program instructions to determine that the smart contract rules are satisfied by the focus angle and the authenticating the user;
program instructions to execute the eye contact-based computing event; and
program instructions to log the eye contact-based computing event on a ledger system.

10. The computer program product of claim 9, wherein the triggering event is when the eye movement is a gaze point on the user for a predetermined amount of time and wherein identifying that the smart contract rules have been satisfied comprises:
program instructions to determine if the user's eye focus angle overlaps with another user's eye focus angle or overlaps with a point of sale sensor.

11. The computer program product of claim 9 further comprising:
program instructions to prompt the user to create the smart contract rules, wherein prompting the user to create smart contract rules comprises:
program instructions to generate responsive prompts instructing the user to create custom smart contract rules for individual users, crowds, financial transactions, type of transactions, data transfers, multiple user transaction, remote transactions, or type of point of sale system.

12. The computer program product of claim 11 further comprising:
program instructions to dynamically change the users eye focus angle based on the smart contract rules, wherein dynamically changing comprises:
program instructions to adjust the users eye focus angle to match a predetermined focus angle established for a particular smart contract rule associated with a particular eye contact-based computing event.

13. The computer program product of claim 9, wherein identifying the user's eye focus angle comprising:
program instructions to generate an augmented reality display of the user's eye focus angle on the smart lens to assist the user in creating an overlapping eye focus angle with another user or a point of sale system.

14. The computer program product of claim 9 further comprising:
program instructions to validate the eye contact-based computing event, wherein validating comprises:
program instructions to generate an augmented reality prompt on the smart lens that prompt the user to select a stored payment method and confirm an amount or file associated with the eye contact-based computing event.

15. A computer system for authorizing and documenting eye contact-based computing events using smart contracts, the computer system comprising:
one or more computer processors;
one or more computer readable storage devices;
program instructions stored on the one or more computer readable storage devices for execution by at least one of the one or more computer processors, the stored program instructions comprising:
program instructions to receive smart contract rules from a user associated with performing the eye contact-based computing events using a smart lens;
program instructions to monitor eye movement for a triggering event;
program instructions to determine an eye contact-based computing request is occurring based on an occurrence of the triggering event;
program instructions to authenticate the user through biometric security measures on the smart lens;
program instructions to identify a focus angle based on measurements by the smart lens;
program instructions to determine that the smart contract rules are satisfied by the focus angle and the authenticating the user;
program instructions to execute the eye contact-based computing event; and
program instructions to log the eye contact-based computing event on a ledger system.

16. The computer system of claim 15, wherein the triggering event is when the eye movement is a gaze point on the user for a predetermined amount of time and wherein identifying that the smart contract rules have been satisfied comprises:
program instructions to determine if the user's eye focus angle overlaps with another user's eye focus angle or overlaps with a point of sale sensor.

17. The computer system of claim 15 further comprising:
program instructions to prompt the user to create the smart contract rules, wherein prompting the user to create smart contract rules comprises:
program instructions to generate responsive prompts instructing the user to create custom smart contract rules for individual users, crowds, financial transactions, type of transactions, data transfers, multiple user transaction, remote transactions, or type of point of sale system; and
program instructions to dynamically change the users eye focus angle based on the smart contract rules, wherein dynamically changing comprises:
program instructions to adjust the users eye focus angle to match a predetermined focus angle established for a particular smart contract rule associated with a particular eye contact-based computing event.

18. The computer system of claim 15, wherein identifying the user's eye focus angle comprising:
program instructions to generate an augmented reality display of the user's eye focus angle on the smart lens to assist the user in creating an overlapping eye focus angle with another user or a point of sale system.

19. The computer system of claim 15 further comprising:
program instructions to validate the eye contact-based computing event, wherein validating comprises:
program instructions to generate an augmented reality prompt on the smart lens that prompt the user to select a stored payment method and confirm an amount or file associated with the eye contact-based computing event.

20. The computer system of claim 15, wherein the triggering event is when the eye movement is a focus angle including a point of sale sensor.

* * * * *